United States Patent [19]
Stary

[11] Patent Number: 5,325,888
[45] Date of Patent: Jul. 5, 1994

[54] PIPELINE VALVE TRANSMISSION APPARATUS

[76] Inventor: Gary M. Stary, 636 Thorn Hollow Dr., Coraopolis, Pa. 15108

[21] Appl. No.: 56,313

[22] Filed: Apr. 30, 1993

[51] Int. Cl.$^5$ ............................................. F16K 37/00
[52] U.S. Cl. .................................... 137/553; 137/554; 251/58; 251/60; 251/250; 74/422
[58] Field of Search ..................... 137/553, 556, 554; 251/58, 60, 250; 74/98, 89.17, 422

[56] References Cited

U.S. PATENT DOCUMENTS

| | | | |
|---|---|---|---|
| 802,946 | 10/1905 | Waterman | 251/250 X |
| 842,961 | 2/1907 | Kewley | 137/553 X |
| 2,074,701 | 3/1937 | Lohmolder | 251/250 X |
| 3,104,862 | 9/1963 | Pearson et al. | 251/58 |
| 3,107,080 | 10/1963 | Priese | 251/58 X |
| 3,338,140 | 8/1967 | Sheesley | 251/250 X |
| 4,034,958 | 7/1977 | Masclet | 251/250 X |
| 4,093,180 | 6/1978 | Strabala | 251/248 |
| 4,100,816 | 7/1978 | Clark | 251/58 X |
| 4,566,670 | 1/1986 | Nordlund | 251/58 X |
| 4,647,003 | 3/1987 | Hilpert et al. | 251/58 X |
| 4,949,936 | 8/1990 | Messina | 251/58 |
| 5,050,638 | 9/1991 | Zeller et al. | 137/553 |

OTHER PUBLICATIONS

Bimba Manufacturing Company, "Bimba Pneu-Turn Rotary Actuator", 1992, entire brochure, U.S.A.
Carter Controls, Inc., Bulletin MRA-24B-"Rotary Torque Actuators", date unknown, pp. 86-89, U.S.A.
Worcester Controls, "The Series 39 Pneumatic Actuator", date unknown, pp. 1-9, place of publication unknown.
ASAHI/AMERICA "Corrosion-Resistant Pneumatic Actuators", 1991, entire brochure, U.S.A.

Primary Examiner—John Rivell
Attorney, Agent, or Firm—Kirkpatrick & Lockhart

[57] ABSTRACT

An apparatus is provided which includes a valve transmission designed to connect a valve actuator to a rotational valve. The valve transmission includes a pinion, a pair of stepped racks, and a lower gear, all within a housing. The pinion is designed to be driven by a rotating shaft of an actuator. The pinion engages the teeth of the racks on the upper steps. The lower steps of the rack are displaced laterally from the upper steps to engage a lower gear that is either of lesser or greater diameter than the pinion depending on whether a positive or negative mechanical advantage is desired. The lower steps drive the lower gear which is connected to the drive shaft of a rotational valve. The transmission is placed within a housing which removeably mounts to the valve body.

19 Claims, 7 Drawing Sheets

PIPELINE VALVE TRANSMISSION APPARATUS

BACKGROUND OF THE INVENTION

1. Field of the Invention

The present invention relates to pipeline valve apparatus and, more particularly, to improvements in valve transmission apparatus.

2. Description of the Invention Background

Various methods and devices for imparting rotary motion to rotary actuated devices are known in industry. For example, ball and butterfly valves that are used for controlling the flow of liquid materials ranging from milk to oil are commonly controlled by rotary actuators that convert linear motion to rotary motion. In addition, rotary actuators have also been used to impart rotary motion to indexing tables on small part assembly lines in the electronics industry. In general, rotary actuators have also been used in a plethora of other process and assembly operations requiring rotary motion. Such rotary actuators, in some applications, are directly linked to the valves or other devices to be rotated. However, it is desirable to have a transmission between the actuator and the valve which alters the speed of rotation and torque between the output shaft of an actuator and input shaft to the valve or other devices. In some applications, the device to be rotated requires greater power than the actuator is capable of producing. In other applications, it is necessary to increase or decrease the speed of rotation of the valve from the speed of rotation of the actuator shaft. Transmissions are desirable which will achieve the increased or decreased torque or speed while transmitting the motion from the actuator to the valve.

Heretofore, valve transmissions have been of various types including, for example, a transmission which has an actuator and transmission integral with one another. This transmission has a piston, which when actuated, drives a rack in lateral alignment with the piston to turn a pinion. Such an arrangement severely limits the versatility of the transmission as the actuator and transmission are one unit. Also, in order to change the gear ratio or other operating characteristics of such a transmission, the entire actuator/transmission unit must be replaced. A transmission is needed which provides for a simple method of changing the gear ratio without replacing the entire actuator.

A transmission is also needed which includes electronic and mechanical monitoring systems to indicate the position of the valve.

A transmission is further needed which will permit accurate, efficient and effective conversion of the linear motion of an actuator to rotary motion for an object to be rotated.

The present invention is directed toward an improved design for a valve transmission apparatus which overcomes, among others, the above discussed problems.

BRIEF SUMMARY OF THE INVENTION

The present invention provides a valve transmission which overcomes many of the deficiencies of valve transmissions in the past. The valve transmission is designed to connect a valve actuator, such as the one found in my U.S. Pat. No. 5,170,693, the disclosure of which is hereby incorporated by reference, to a rotational valve, such as the one found in my U.S. Pat. No. 5,160,118, the disclosure of which is also hereby incorporated by reference.

The valve transmission of the present invention is versatile in that it can be manufactured in a wide range of gear ratios by providing a variety of gear sizes to suit particular needs. The gear ratio will, of course, determine the ratio of input to output speed and the ratio of input to output torque.

The valve transmission includes a pinion, a pair of stepped racks, and a lower gear, all within a housing. The pinion is designed to be driven by a rotating shaft of an actuator. Each stepped rack has an upper step and a lower step which are connected together by a mounting block. The upper step and the lower step have teeth on parallel planes. The pinion engages the teeth of the rack on the upper step. Under most operating conditions, it is desirable to have the lower step of the rack on a separate but parallel plane from the upper step to engage a lower gear that is either of lesser or greater diameter than the pinion depending on whether a positive or negative mechanical advantage is desired. However, one skilled in the art will recognize that the upper and lower racks may be aligned to provide a pinion and lower gear of equal diameters. The optimum gear ratio for any given application is determined by many variables as one skilled in the art will also recognize. The lower step drives the lower gear which is connected to the drive shaft of a rotational valve. The transmission is placed within a housing which removeably mounts to the valve body and actuator.

As the rack is not integral to the actuator, the entire transmission may be replaced or component parts may be changed; thus, the transmission overcomes many of the deficiencies of the transmissions of the past. Additionally, as will become readily apparent, the transmission is versatile in that, through minor modification, the mechanical advantage provided by the gear ratio can be easily modified or even inverted. Further, the transmission apparatus disclosed herein allows for a desired position to be efficiently attained and maintained until repositioning is desired.

These and other details, objects and advantages of the present invention will become apparent as the following description of the preferred embodiment thereof proceeds.

DESCRIPTION OF THE DRAWINGS

In the accompanying drawings, I have shown a present preferred embodiment of the invention wherein.

DETAILED DESCRIPTION OF THE PREFERRED EMBODIMENTS

Figure 1:
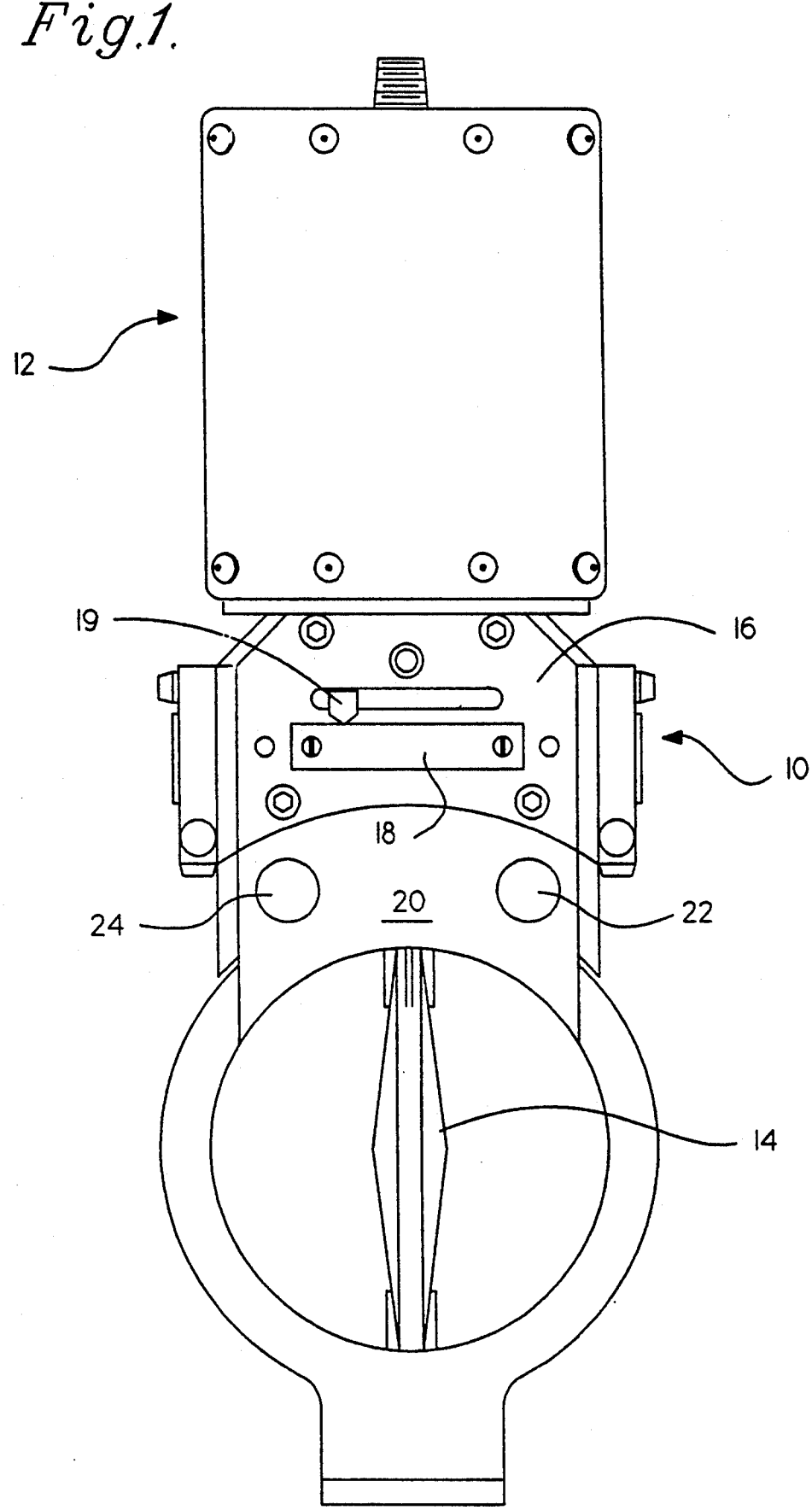
FIG. 1 illustrates a side elevational view of the transmission of the present invention mounted between an actuator and a valve.

Referring now to the drawings wherein the showings are for purposes of illustrating the preferred embodiments of the present invention only and not for purposes of limiting same, the Figures show a valve transmission apparatus 10 for use in connection with an actuator and a butterfly valve. FIG. 1 illustrates the present invention connected to an actuator 12 and a butterfly valve 14. The transmission housing 16 has a position indicator 18 which together with pointer 19 indicates the location of the butterfly valve 14. The transmission housing 16 is preferably made of steel or aluminum, although it can be made of any one of many suitable materials.

Figure 2:
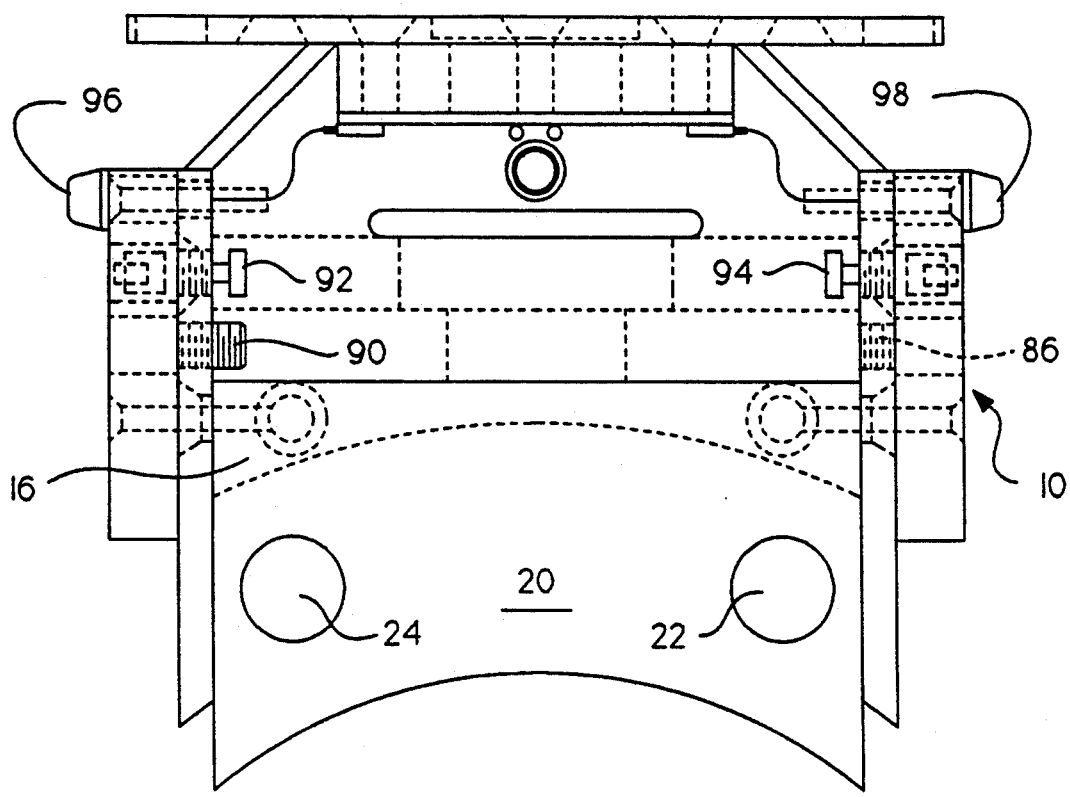
FIG. 2 illustrates a side elevational view of the transmission of the present invention.
Figure 3:
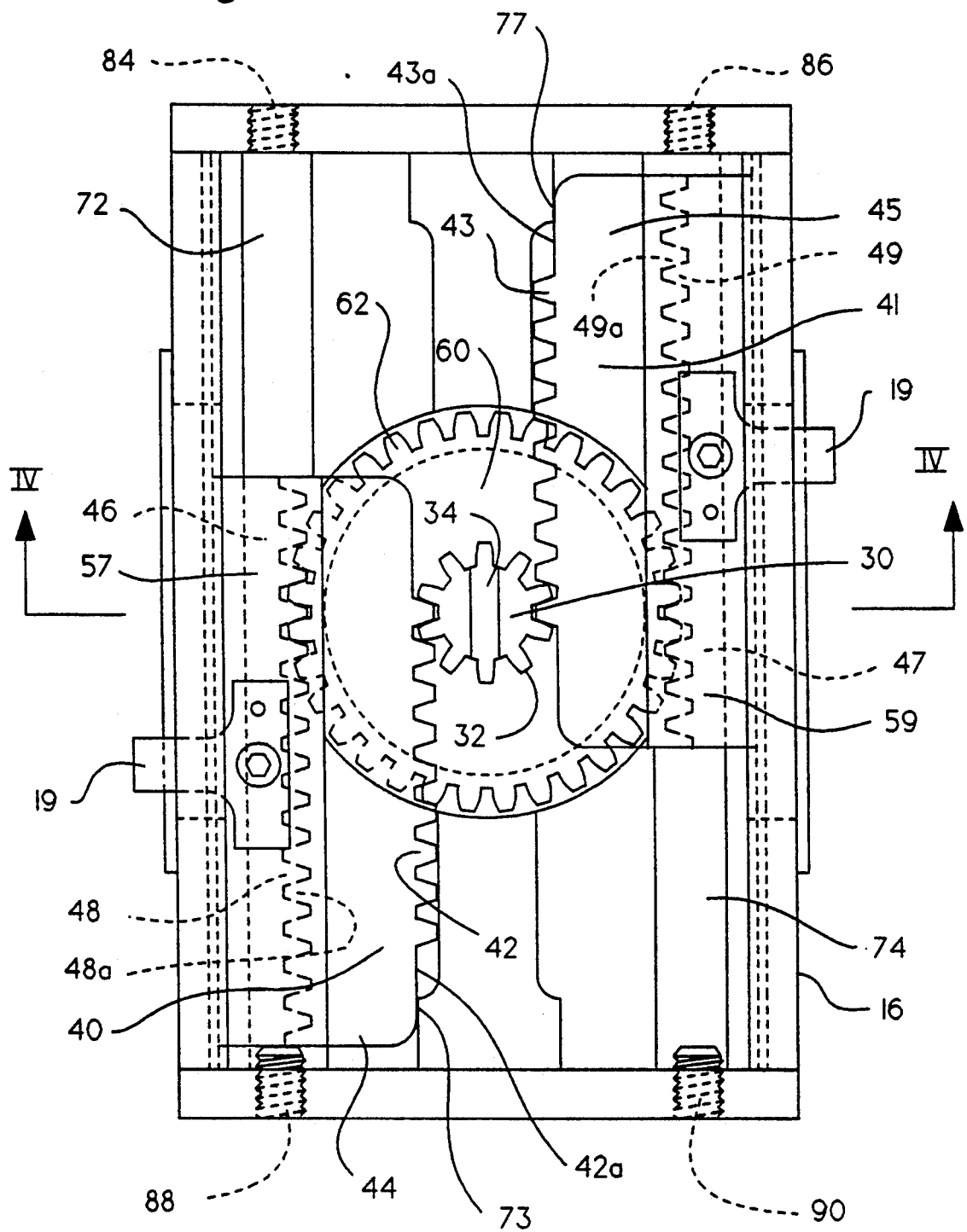
FIG. 3 illustrates a top plan view of the transmission of the present invention.
Figure 4:
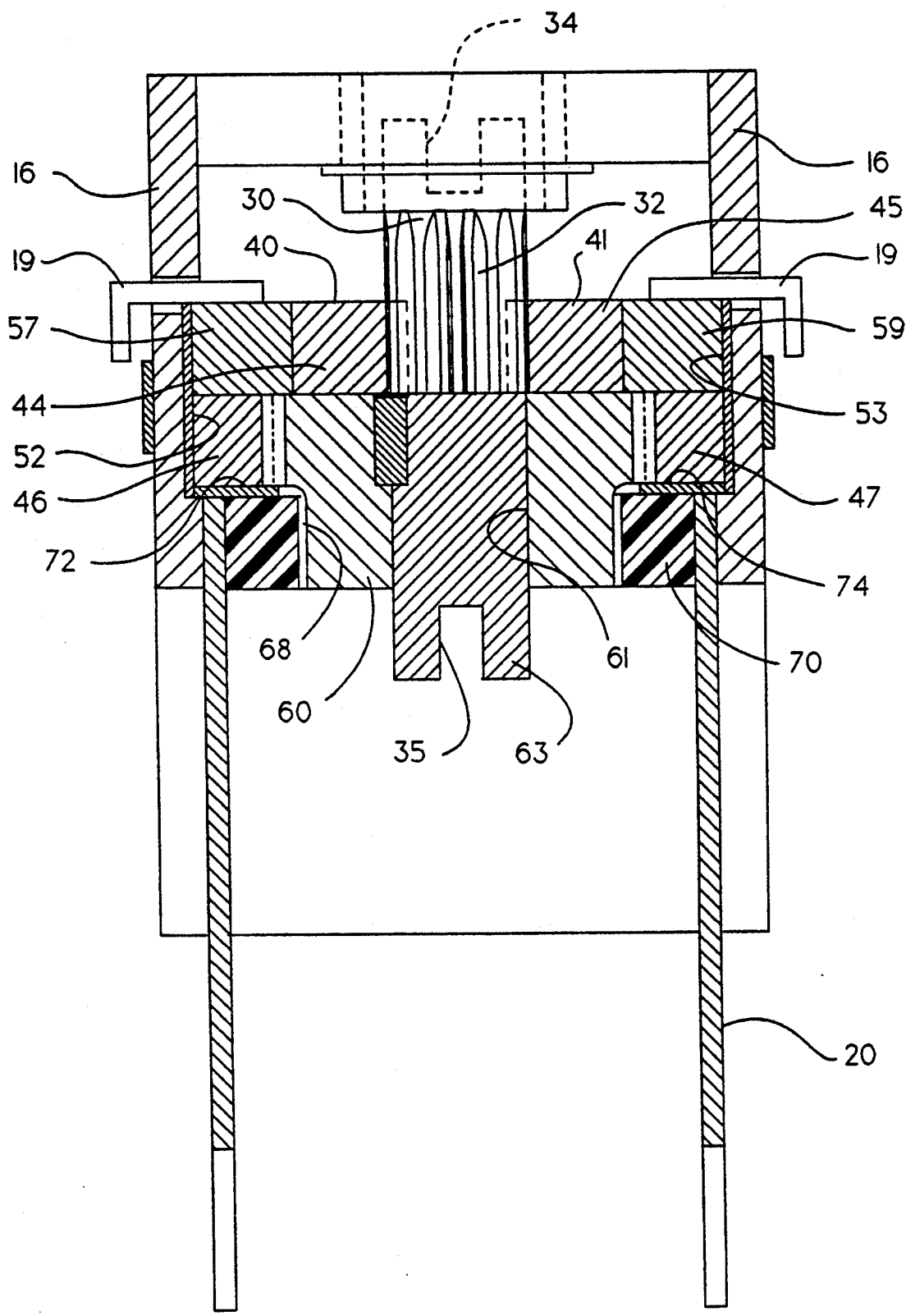
FIG. 4 illustrates a cross sectional view of the transmission of FIG. 3 taken along the line IV—IV in FIG. 3.

In FIG. 2, the valve transmission 10 is shown with a mounting flange 20 having bores 22 and 24 for attachment to a flange in a pipeline (not shown). Referring to FIGS. 3 and 4, within the housing 16 is a pinion 30 having teeth 32 and a coupling slot 34. The coupling slot 34 is adapted to receive rotational input from a corresponding actuator shaft (not shown) to which rotary motion has been imparted by known actuating means or by the actuator disclosed in my U.S. Pat. No. 5,170,693. A pair of stepped, opposed racks 40 and 41 are provided within housing 16. However, it will be appreciated that only one rack 40 or 41 may be used in the principle and scope of the present invention. Each stepped rack, as described more fully below, is constructed in the shape of, in side view, an "L" with the vertical surfaces of the "L" having teeth thereon. The racks are preferably made of steel or other materials known for use in commercial gear manufacture. The rack 40 has teeth 42 in the vertical plane 42a on upper step 44 which correspond to the teeth 32 on the pinion 30. Similarly, a rack 41 has teeth 43 in the vertical plane 43a on the upper step 45 which correspond to the teeth 32 on the pinion 30. The rack 40 has a lower step 46 with teeth 48 on the vertical plane 48a. Similarly, the rack 41 has a lower step 47 with teeth 49 on the vertical plane 49a. If desired, as best seen in FIGS. 9-12, each of the racks 40 and 41 may be comprised of different appropriate materials such as steel and brass and held together by bolts 36 and 38 on the rack 40 and bolts 37 and 39 on the rack 41. In such case, mounting blocks 57 and 59, of brass or other appropriate material, may be utilized to attach the upper steps 44 and 45, respectively, to the corresponding lower steps 46 and 47, respectively. In addition, the pointers 19 can be directly attached to the racks 40 and/or 41.

A lower gear 60, as best seen in FIGS. 3 and 4, has a bore 61 for receiving a shaft 63 and teeth 62 which correspond to the teeth 48 on the rack 40 and teeth 49 on the rack 41. Although the Figures depict one ratio of upper step separation to lower step separation (i.e. the ratio of pinion diameter to lower gear diameter), one of ordinary skill in the art will recognize that a great variety of ratios are possible. The shaft 63 may include a slot 35 or other means for connection to a valve such as disclosed in my U.S. Pat. No. 5,160,118 or other apparatus to be rotated.

Figure 9:
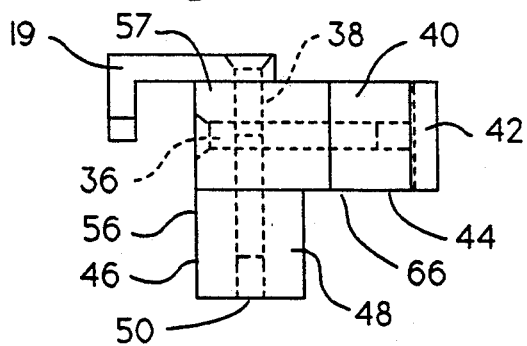
FIG. 9 is a side elevational view of one rack of the present invention.
Figure 10:
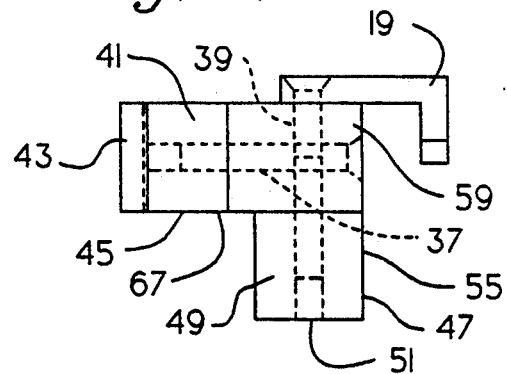
FIG. 10 is a side elevational view of another rack of the present invention.
Figure 7A:
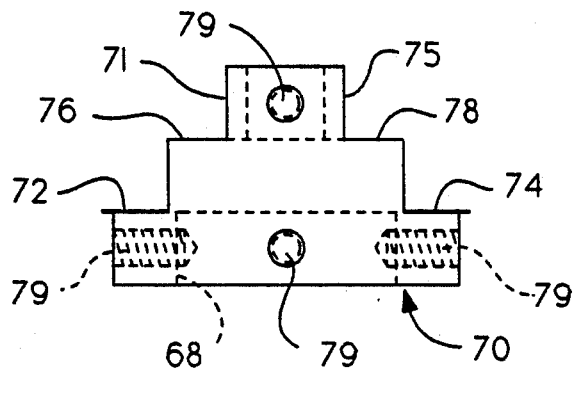
FIG. 7A is a side elevational view of the mounting base of the present invention.
Figure 7B:
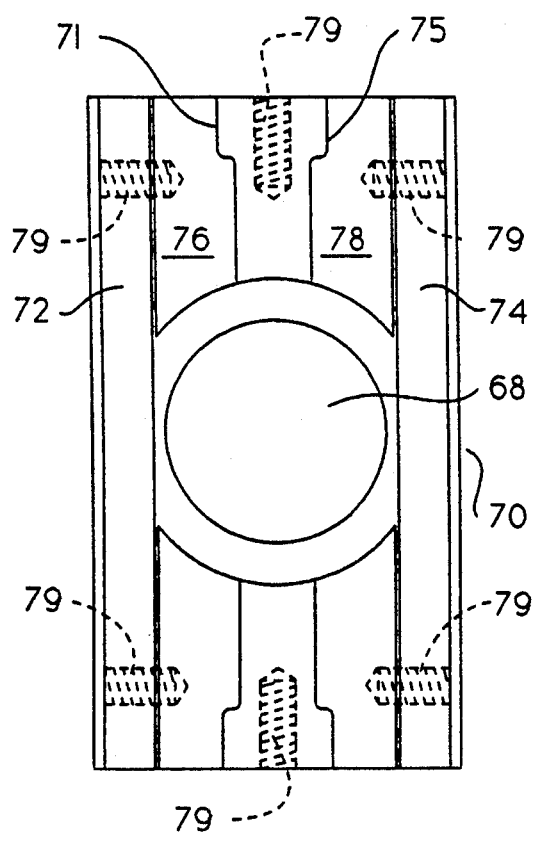
FIG. 7B is a top plan view of the mounting base of FIG. 7A.

As shown in FIGS. 9 and 10, the racks 40 and 41 have contact surfaces 50 and 51, respectively. The racks 40 and 41 are disposed within the front and back housing plates 16 for translational movement on a mounting base 70. The mounting base 70 can be made of any appropriate material which will support the racks 40 and 41 for sliding movement such as, for example, steel, brass, aluminum or a rigid polymer. The screws 79 secure the front and back housing plates 16 to the mounting base 70. As shown in FIGS. 7A and 7B, the mounting base 70 has a bore 68 for receiving the lower gear 60. Shim bearing surfaces 72 and 74 adjacent to the mounting base 70 are provided to permit translational movement of the racks 40 and 41, respectively. Contact surfaces 50 and 51 bear upon the shim bearing surfaces 72 and 74, respectively, to allow for sliding contact between the racks 40 and 41, respectively, and the shim bearing surfaces 72 and 74, respectively, of the mounting base 70. The shim bearing surfaces 72 and 74 can consist of brass or other materials with a low coefficient of friction upon which the racks 40 and 41 may translate. Guide surfaces 76 and 78, along with vertical guide surfaces 71 and 75, are provided to ensure a true, straight horizontal translation of the racks 40 and 41. Guide surfaces 76 and 78 contact rack guide surfaces 66 and 67, respectively. Vertical guide surfaces 71 and 75 contact bearing surfaces 73 and 77, respectively, to maintain horizontal translation of the racks 40 and 41.

The housing 16 also has side bearing surfaces 52 and 53, respectively, to facilitate translation of the racks 40 and 41, respectively. Surface 56 on rack 40 and surface 55 on rack 41 slide across side bearing surfaces 52 and 53, respectively.

Figure 11:
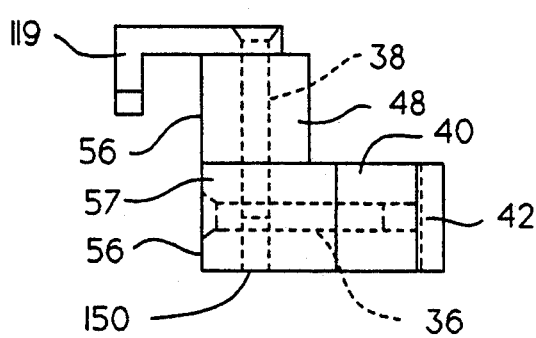
FIG. 11 is a side elevational view of the rack of FIG. 9 in the inverted position.
Figure 12:
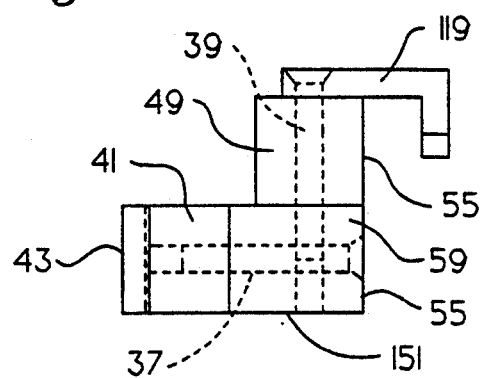
FIG. 12 is a side elevational view of the rack of FIG. 10 in the inverted position.
Figure 5:
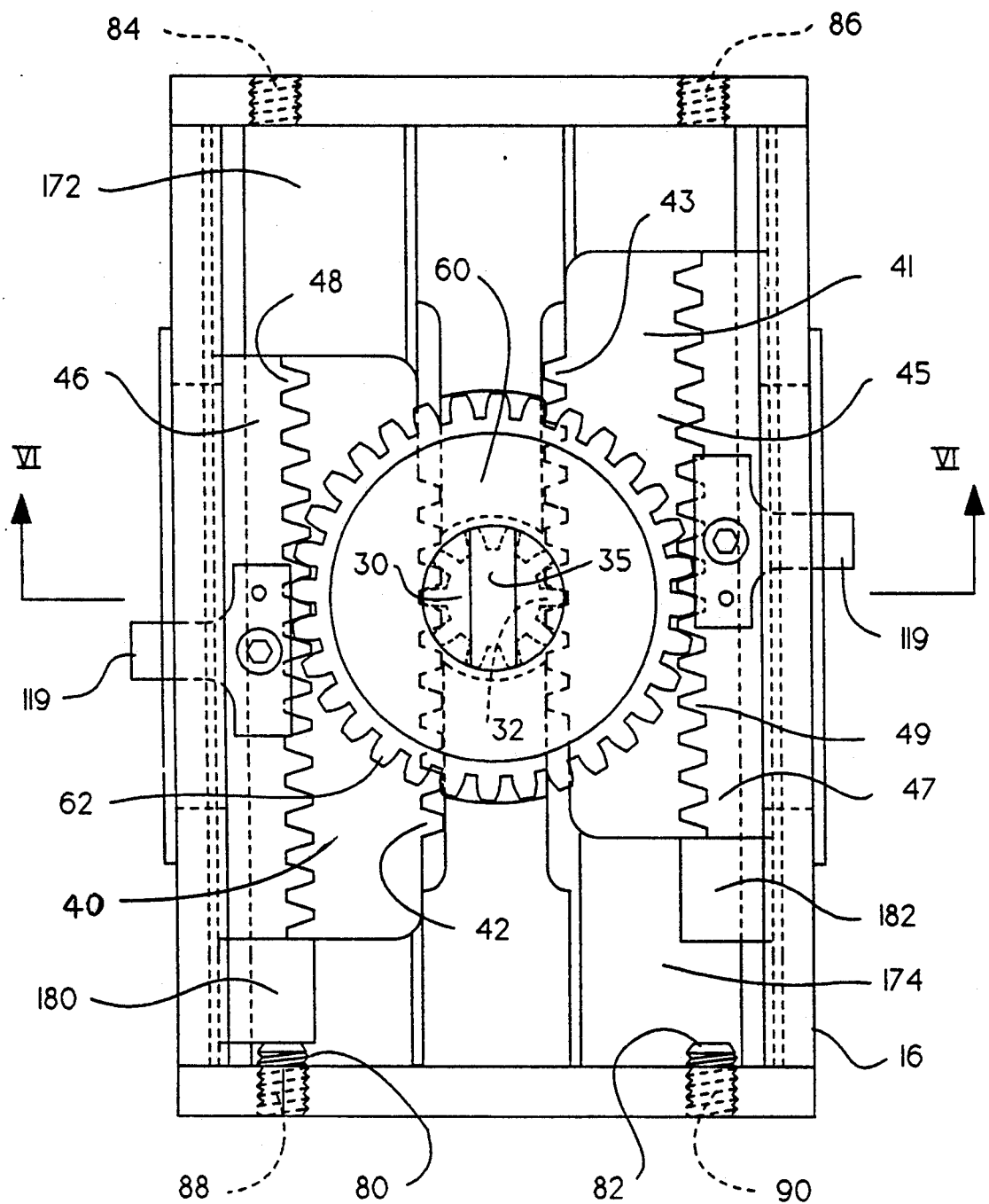
FIG. 5 illustrates a top view of another embodiment of the transmission of the present invention.
Figure 6:
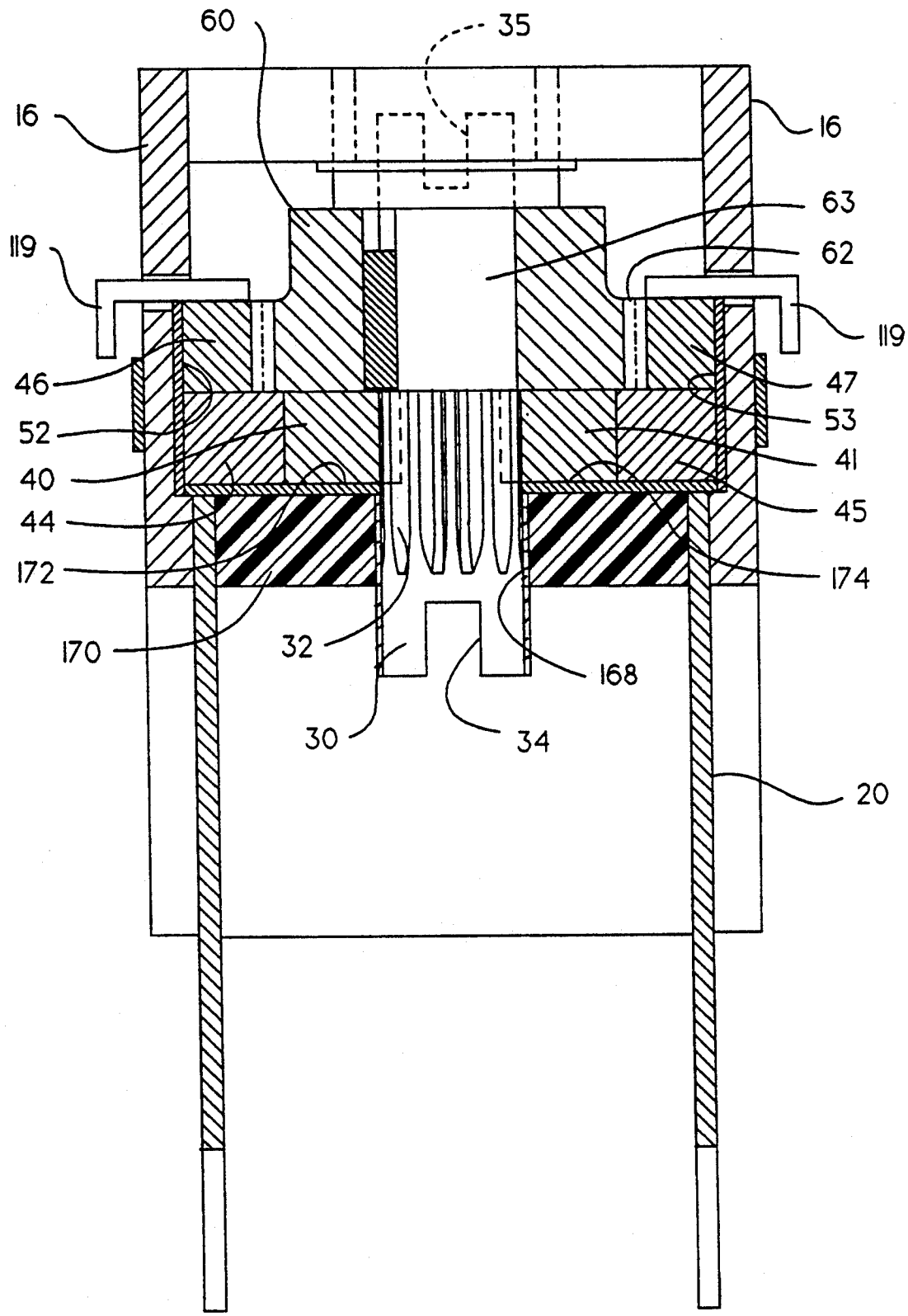
FIG. 6 illustrates a cross sectional view of the transmission of FIG. 5 taken along the line VI—VI in FIG. 5.
Figure 8A:
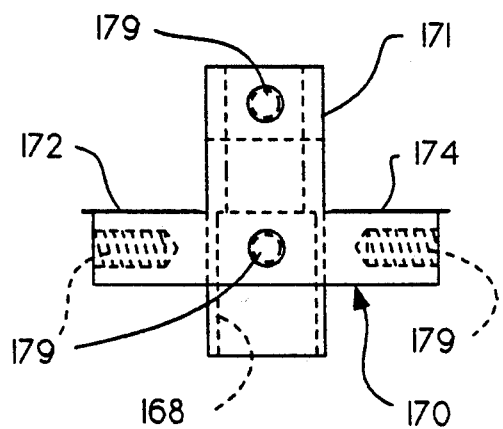
FIG. 8A is a side elevational view of another embodiment of the mounting base of the present invention.
Figure 8B:
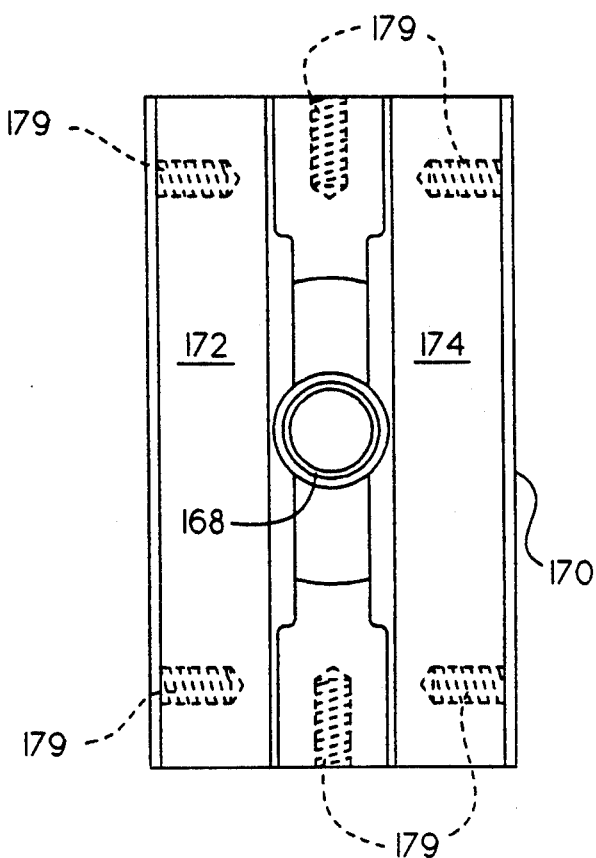
FIG. 8B is a top plan view of the mounting base of FIG. 8A.

As shown in FIGS. 5 and 6, the positions of the pinion 30, the racks 40 and 41 and the lower gear 60 may be arranged in reverse, which provides a 90° valve rotation with a significantly shorter actuator travel stroke, and increased speed. This gear arrangement is more conducive to hydraulic application, whereas the embodiment shown in FIGS. 3 and 4 provides mechanical advantage but sacrifices piston volume displacement performance, which is better suited for pneumatic actuation. In FIG. 6, the positions of the pinion 30 and the lower gear 60 have been reversed from those shown in FIG. 4. Also, the mounting base 70 is replaced with the mounting base 170, consisting of the same material. The front and back mounting plates 16 are connected to the mounting base 170 by screws 179, shown in FIGS. 8A and 8B. FIGS. 9 and 10 show a side view of the racks 40 and 41 in the first position (i.e. corresponding to FIGS. 3 and 4) and FIGS. 11 and 12 show the racks 40 and 41 in the inverted position (i.e. corresponding to FIGS. 5 and 6). Also shown in FIGS. 9, 10, 11 and 12 are the pointers 19 (FIGS. 9 and 10) and 119 (FIGS. 11 and 12) which project through the housing 16 to illustrate the position of the valve.

Mounting base 170 has shim bearing surfaces 172 and 174, similar in composition to shim bearing surfaces 72 and 74. In the inverted position, the contact surface 150 of the rack 40 bears on the shim bearing surface 172 and the contact surface 151 of the rack 41 bears on the shim bearing surface 174. The mounting base 170 also includes a bushing 168 to support and stabilize the pinion 30 and a guide post 171 to facilitate horizontal translation of the racks 40 and 41.

If desired, stop members 80 and 82 can be inserted in bores 84 and 86 or 88 and 90 (FIG. 5) to limit the motion of the racks. Referring to the embodiment disclosed in FIGS. 5 and 6, the racks 40 and 41 travel a distance to produce a 90° rotation which distance is much less than that of the racks shown in FIGS. 3 and 4. Therefore, travel stop extensions 180 and 182 are required. Additionally, electronic sensors 92 and 94 (FIG. 2) may be provided to indicate full open and full closed positions of the valve. The sensors 92 and 94 may be connected to indicator lights 96 and 98 through appropriate circuitry, which is well within the skill of one skilled in the art to construct.

In operation, referring to FIGS. 3 and 4, the output shaft of the actuator (not shown) is connected to the pinion 30 by slot 34. When the actuator rotates the actuator shaft, the motion is imparted to the pinion 30 which causes the pinion 30 to rotate. In turn, the rotation of the pinion 30, which has teeth 32 in engagement with the teeth 42 of rack 40 and teeth 43 of rack 41, causes the pair of racks 40 and 41 to translate in opposite directions. The translation of the racks 40 and 41 causes the lower gear 60, which has teeth 62 in engagement with teeth 48 of rack 40 and teeth 49 of rack 41, to rotate. The lower gear 60, which when connected to an input shaft of the valve (not shown) by coupling slot 35 in shaft 63, drives the input shaft of the valve causing it to turn. The racks 40 and 41 can be moved by the actuator shaft and held in any desired position along the path of travel of the racks 40 and 41 so that the valve may be held in any position between and including the fully open and fully closed positions. The position of the valve 14 will be indicated by the position of pointer 19 on position indicator 18. Also, the sensors 92 and 94 can indicate the valve position.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. A transmission apparatus for transmitting power from an actuator producing a rotational output to a receiving apparatus constructed to receive a rotational input, comprising:
   a housing;
   a mounting base mounted within said housing having a bearing surface;
   a first rack mounted for translational movement on said bearing surface within said housing and having a first toothed surface and a second toothed surface, said first and second toothed surfaces facing in the same direction on parallel planes;
   a pinion within said housing having a toothed surface constructed for engagement with said first toothed surface of said first rack and means for receiving rotational input from the actuator;
   a gear within said housing having a toothed surface constructed for engagement with said second toothed surface of said first rack; and
   means for coupling said gear to said receiving apparatus to rotate said receiving apparatus.

2. The apparatus of claim 1 wherein said first toothed surface and said second toothed surface of said first rack are on separate, parallel planes.

3. The apparatus of claim 1 further including a second rack mounted for translational movement on a second bearing surface on said mounting base within said housing, said second rack having a first toothed surface opposite said first toothed surface of said first rack and a second toothed surface opposite to said second toothed surface of said first rack.

4. The apparatus of claim 1 wherein said mounting base includes a guide surface parallel to said first toothed surface and adapted to contact said toothed surface of said of first rack to maintain said first rack in contact with said bearing surface of said mounting block.

5. The apparatus of claim 1 further including means associated with said first rack for indicating the rotational position of the receiving apparatus.

6. The apparatus of claim 1 further including means associated with said housing for limiting the length of travel of said first rack.

7. The apparatus of claim 3 wherein said first toothed surface and said second toothed surface of said first rack are on separate, parallel planes and said first toothed surface and said second toothed surface of said second rack are on separate, parallel planes.

8. The apparatus of claim 7 wherein said mounting base includes a guide surface parallel to said first toothed surface of said first rack and adapted to contact a bearing surface parallel to and adjacent said first toothed surface of said of first rack to maintain said first rack in contact with said bearing surface of said mounting block.

9. The apparatus of claim 7 further including means associated with said first rack for indicating the rotational position of the receiving apparatus.

10. The apparatus of claim 7 further including means associated with said housing for limiting the length of travel of said first rack.

11. The apparatus of claim 7 wherein said pinion and said gear are coaxial.

12. A valve transmission apparatus for transmitting power from an actuator producing rotational output to a valve constructed to receive rotational input, comprising:
    a housing;
    a mounting base mounted within said housing having a bearing surface;
    a first rack mounted for translational movement on said bearing surface within said housing, having a first toothed surface and a second toothed surface, said first and second toothed surfaces facing in the same direction on parallel planes;
    a pinion within said housing having a toothed surface constructed for engagement with said first toothed surface of said first rack and means for receiving rotational input from the actuator;
    a gear within said housing having means for receiving an input shaft of the valve and a toothed surface constructed for engagement with said second toothed surface of said first rack; and
    means for coupling said gear to said valve to rotate said valve.

13. The apparatus of claim 12 wherein said first toothed surface and said second toothed surface of said first rack are on separate, parallel planes.

14. The apparatus of claim 12 further including a second rack mounted for translational movement on a second bearing surface on said mounting base within said housing, said second rack having a first toothed surface opposite said first toothed surface of said first rack and a second toothed surface opposite said second toothed surface of said first rack.

15. The apparatus of claim 14 wherein said first toothed surface and said second toothed surface of said first rack are on separate, parallel planes and said first toothed surface and said second toothed surface of said second rack are on separate, parallel planes.

16. The apparatus of claim 12 wherein said mounting base includes a guide surface parallel to said first toothed surface of said first rack and adapted to contact a bearing surface parallel to and adjacent said first toothed surface of said of first rack to maintain said first rack in contact with said bearing surface of said mounting block.

17. The apparatus of claim 12 further including means associated with said first rack for indicating the rotational position of the valve.

18. The apparatus of claim 12 further including means associated with said housing for limiting the length of travel of said first rack.

19. A valve transmission apparatus for transmitting power from an actuator producing rotational output to a valve constructed to receive rotational input, comprising:
   a housing;
   a mounting base mounted within said housing having first and second bearing surfaces;
   a first rack mounted for translational movement on said first bearing surface within said. housing and having a first toothed surface and a second toothed surface;
   a second rack mounted for translational movement on said second bearing surface within said housing, having a first toothed surface opposite said first toothed surface of said first rack and a second toothed surface opposed to said second toothed surface of said first rack, said first toothed surface and said second toothed surface of said first rack constructed to be on separate, parallel planes and said first toothed surface and said second toothed surface of said second rack constructed to be on separate, parallel planes;
   said mounting base further including a first guide surface parallel to said first toothed surface of said first rack adapted to contact a bearing surface parallel to and adjacent said first toothed surface of said of first rack to maintain said first rack in contact with said first bearing surface of said mounting block and a second guide surface parallel to said first toothed surface of said second rack adapted to contact a bearing surface parallel to and adjacent said first toothed surface of said second rack to maintain said second rack in contact with said second bearing surface of said mounting block;
   a pinion within said housing having a toothed surface constructed for engagement with said first toothed surfaces of said racks and having means for receiving rotational input from the actuator;
   a gear within said housing having a toothed surface constructed for engagement with said second toothed surfaces of said racks; and
   means for coupling said gear to said valve to rotate said valve.

* * * * *